Feb. 23, 1960 HIROSHI SHIMIZU ET AL 2,926,110
PROCESS FOR THE PURIFICATION OF BEET SUGAR JUICE BY
MEANS OF ION EXCHANGE RESINS
Filed July 18, 1958
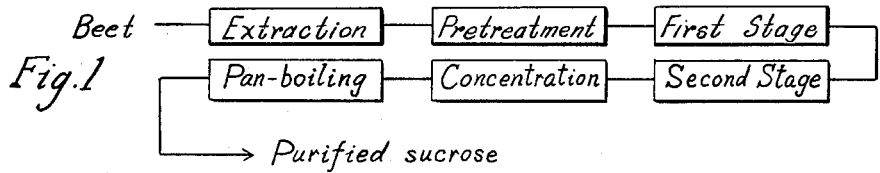
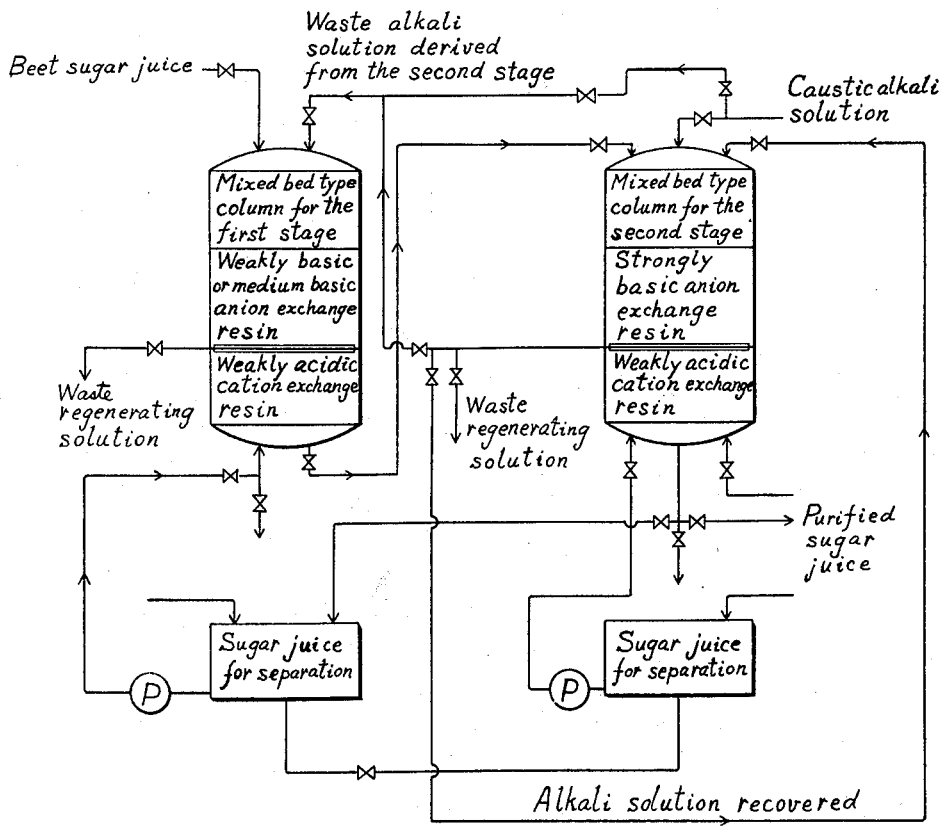
INVENTORS
HIROSHI SHIMIZU, AKIMITU MIYAHARA, SHOZO OIKAWA and
OSAMU NASU
BY
ATTORNEYS

United States Patent Office 2,926,110
Patented Feb. 23, 1960

---

2,926,110

PROCESS FOR THE PURIFICATION OF BEET SUGAR JUICE BY MEANS OF ION EXCHANGE RESINS

Hiroshi Shimizu and Akimitu Miyahara, Tokyo, Shozo Oikawa, Shibetsu-shi, Hokkaido, and Osamu Nasu, Obihiro-shi, Hokkaido, Japan Application July 18, 1958, Serial No. 749,488

Claims priority, application Japan July 25, 1957

4 Claims. (Cl. 127—46)

This invention relates to improvements in a process for the purification of beet sugar juice by means of ion exchange resins.

In general, beet sugar juice contains a large quantity of salts as impurities which have considerable disadvantageous influences. That is to say, the crystallisation of sugar is impeded by these salts during the pan-boiling operation in the purification of the sugar juice resulting in lowering the yield. Furthermore, such salts are a cause of promoting coloring during the process and developing scale inside the evaporator.

Not a few studies have been made for developing processes for desalting by means of ion-exchange resins ever since the ion-exchange resins were invented. However, in the early days, as only strongly acidic cation exchange resins and weakly basic anion exchange resins were available as ion exchange resins, these resins were used in a two-bed system to conduct experiments on beet sugar juice in various process stages.

However, the process proved very expensive because beet sugar juice contains a large quantity of salts to be removed. In addition, since a strongly acidic cation exchange resin was utilized, the sugar was apt to be inverted. In order to prevent the sugar from inversion, the temperature of the sugar had to be maintained below 20° C. during the operation of the process. Thus a tremendous heat loss occurred, so that a profit which could be obtained from the desalting was overwhelmed by the operation cost and the process was not a commercial success.

Since then weakly acidic cation exchange resins and strongly basic anion exchange resins were invented. Processes using these newly invented resins were generally studied but it was found that the cost of a regenerating agent, caustic soda, ran too high due to the poor regenerating efficiency of the strongly basic anion exchange resin and that the resins used were sometimes contaminated with a sugar juice having a high color value. Thus such attempts were in vain commercially and merely softening and decolorization operations are being done.

According to this invention, sugar juice which has been extracted from beet and pretreated is desalted and decolorized by means of a weakly acidic cation exchange resin, a weakly basic or medium basic anion exchange resin, and a strongly basic anion exchange resin. By virtue of this invention, a large quantity of salts and coloring matter contained in the beet sugar juice is removed completely and economically thus increasing yield, improving the quality of the product, and preventing the evaporator from scaling.

By pretreatment here is meant such a treatment for removing colloidal substances, suspensoids, and high molecular compounds, for example, coloring matter, by coagulation or treatment by means of a chlorine type of strongly basic anion exchange resin, in order to make effective and facilitate the subsequent desalting and decolorizing.

Regarding operation of the process according to this invention, in the first stage, sugar juice extracted from beet is pretreated as above to remove colloidal substances, part of coloring matter, and part of salts and is passed through a mixed bed type resin column packed with a mixture of a hydrogen type of weakly acidic cation exchange resin and a hydroxyl type of weakly basic or medium basic anion exchange resin so as to adsorb the greater part of the large quantity of salts and coloring matter contained in the beet sugar juice. In the second stage, the sugar juice thus desalted and decolorized in the first stage is passed through a mixed bed type resin column packed with a hydrogen type of weakly acidic cation exchange resin and a strongly basic anion exchange resin so as to complete the desalting and decolorization. In order to regenerate these resins, the weakly acidic cation exchange resin is treated with a mineral acid such as hydrochloric acid, sulphuric acid, etc. and the anion exchange resin is treated as follows, i.e. the strongly basic anion exchange resin used in the second stage is treated at first with caustic alkali and the weakly basic or medium basic anion exchange resin used in the first stage is then treated with waste of the caustic alkali.

In this case, a newly prepared solution of caustic alkali may be added to the waste caustic alkali solution with which the weakly basic or medium basic anion exchange resin is treated.

Ion exchange resins available for use in the process according to this invention are as follows: For the first stage, a weakly acidic cation exchange resin having a carboxyl group, for example, Amberlite IRC-50, Chempro CS-101, Lewatit CNO, Imac C19, and a weakly basic or medium basic anion exchange resin having a primary, secondary, or tertiary amino group, for example, Amberlite IR-45, Amberlite XE-114, Duolite A-30, Dowex-3, are mixed.

For the second stage, the above-stated weakly acidic cation exchange resin is mixed with a strongly basic anion exchange resin having a quaternary ammonium base, for example, Amberlite IRA-401, Amberlite IRA-411, Duolite A-40LC, Duolite A-42LC, Diaion SA #101, Diaion SA #201, Dowex-I-X4, Dowex-2X4, Allassion AS.

In this invention a mixed bed type ion exchanging apparatus is used in which two or more kinds of resins are packed in the resin column. After a batch of sugar juice has been purified, the resins are back washed to separate the mixed resins utilizing the difference in their speed of settling. Subsequently they are treated with such regenerating agents as acids, alkalis, salts, etc., and washed. The washed resins are mixed again for reusing in the purification of beet sugar juice.

Therefore, it is necessary that there is a considerable difference in the settling speeds of the ion exchange resins paired for use in the mixed bed type apparatus. If the difference is small, the ion exchange resins are hardly separated from each other and the regenerating efficiency lowers. Therefore, it is difficult to use such resins as mixed bed type resins.

Thus it is impossible to use in a mixed bed type apparatus Amberlite IRC-50, a cation exchange resin, produced by condensation polymerization of methacrylic acid and divinyl benzene, and Amberlite IR-45, a polyamine type anion exchange resin of polystyrene type, in the first stage of the operation of this invention, since there is a small difference in their speeds of settling.

When Amberlite IRC-50, a cation exchange resin, a condensate of methacrylic acid and divinyl benzene, is paired with Amberlite IRA-401, an anion exchange resin of polystyrene type having a quaternary ammonium base, for use in the second stage, a considerable difference in the speed of settling is found in the early stage of the operation. However, repeated operations of the purification and the regeneration change the settling velocities owing to the resins' absorption of various substances, resulting in reducing the difference in the settling velocities whereby the separation by means of the back washing becomes poor and accordingly the purifying capacity is lowered.

In such a case where ion exchange resins having a small difference in their settling velocities are paired for use in a mixed bed type apparatus, it has been proposed in the past to use, for example, common salt solution as the separating agent. According to such a proposition, the resin column is sweetened off at first by admitting water into the column so as to displace the liquid remaining inside the column with the water and recovering the raw liquid. Subsequently another liquid having a large specific gravity, for example, common salt solution, is passed up flow from the bottom of the column so as to separate the resins which are then washed and subjected to the subsequent regenerating operation.

This separating process proposed as above is disadvantageous in that the operation is complicated, the regenerating operation requires a long time, and, in addition, it is necessary to particularly prepare a solution having a high specific gravity, for example, common salt solution, for the separation of resins. Furthermore, since the salt absorbing capacity of resin remaining after a purifying operation is consumed by the salts in the liquor for the separation of resins, that much more quantity of regenerant becomes necessary. Therefore, the process for the separation as proposed is hardly carried out in practice because of its drawback of requiring considerable expense.

According to this invention, for the separation and regeneration of ion exchange resins having a small difference in settling velocities, which have been paired in a mixed bed without a sweetening-off, the sugar juice is passed up flow through the resins directly after the purifying operation has been completed, said juice being the beet sugar juice pertaining to the purification or a sugar juice having a similar quality thereto, and having an adequately adjusted concentration, whereby separation of resins which have a small difference in settling velocities and which are difficult to separate is thus made extremely effective, and subsequently the sugar juice used for the separation is recovered.

In practice of this invention, the beet sugar juice pertaining to the purification and having a sugar concentration of about 10° Brix or more or a similar quality of sugar juice is used as the separating sugar juice, whereby the sweetening-off operation may be omitted.

In the process of sugar juice treatment according to this invention, if only the first stage operation is carried out, the beet sugar juice is not desalted and decolorized completely so that no benefit such as increased yield of processed sugar is derived. On the other hand, if only the second stage operation is carried without carrying out the first stage operation for the desalting and decolorization, the desalting and decolorization are not effected completely because of the large content of the salts and coloring matter in the sugar juice. Furthermore, such a mode of operation is expensive. The strongly basic anion exchange resin becomes very low in capacity because of the contamination by coloring matter.

In general, the intensity of a combination of an ion exchange resin and an absorbate relates to the intensity of acidity or alkalinity of resin and the intensity of the absorbate's trend to be absorbed. A resin having a weak intensity in absorption absorbs only an absorbate having a strong trend to be absorbed. A resin having a strong intensity in absorption absorbs also an absorbate which is difficult to absorb. On the other hand, when eluting the absorbate by means of the regenerating agent in the regeneration, when the absorbate having a strong trend to be absorbed is absorbed on a resin having a strong intensity in absorption, it is difficult to elute with the regenerating agent. In this case, not only is the regenerating efficiency lowered but the absorbing capacity of the resin is also lowered gradually as the operating cycle is repeated. This phenomenon is especially marked in cases concerning high molecular compounds. The beet sugar juice contains such high molecular compounds as coloring matter, saponin, proteins, etc. which are not removed from the juice completely even after the pretreatment whereby the majority of the compounds is removed. These high molecular compounds can be absorbed almost entirely by means of anion exchange resins. But they are not completely removed in the first stage in which a weakly basic or a medium basic anion exchange resin is used.

If they are treated only in the second stage and not passed through the first stage, those high molecular compounds which have a strong tendency to be absorbed are absorbed strongly by the strongly basic anion exchange resin and the capacity of the resin is lowered due to the compounds remaining and accumulating in the resin and not being elutriated through the regenerating operation.

The present inventors have found after making various studies regarding these matters that it is extremely advantageous to treat a beet sugar juice pretreated to remove high molecular compounds, in such a manner that the juice is at first passed through the resin column of the first stage of the operation described hereinbefore, and then the juice treated in the first stage is passed without intermission through the resin column of the second stage of the operation, in view of the purifying effect on the sugar juice treated, the increased yield of the purified sugar, and the prevention of capacity lowering of the strongly basic anion exchange resin due to contamination by coloring matter.

Furthermore, it was found that the regenerating agent may be utilized very effectively by means of always treating at first the strongly basic anion exchange resin used in the second stage of the operation with caustic alkali, and treating the weakly basic or medium basic anion exchange resin used in the first stage of the operation, with the waste caustic alkali from the above caustic alkali treatment, for regenerating the anion exchange resins. When caustic alkali solution is passed through a strongly basic anion exchange resin as above, the waste solution of the caustic alkali solution contains much caustic alkali not yet reacted. When the waste solution is passed through the weakly basic or medium basic anion exchange resin of the first stage of the operation, it is possible to regenerate the weakly basic or medium basic anion exchange resin even with impure caustic alkali containing salts easily and effectively, so that the use of caustic alkali as the regenerating agent is economized considerably, which is very advantageous from the economical point of view of beet sugar juice treatment.

By virtue of the separating operation in the regeneration using sugar juice, it becomes easy to separate the resins and unnecessary to prepare a special solution. Therefore, the complete separation of resin is achieved economically within a short period. Thus, according to this invention, it becomes possible to pair such ion exchange resins which can not be separated by means of water. The process according to this invention may be applied in a mixed bed type apparatus in which, as far as the prior art is concerned, the difference in settling velocities became less and the separation became more difficult as the cycle was repeated, lowering the purifying capacity. Such an apparatus may now be improved in capacity extremely effectively and economically. Thus this invention contributes considerably in shortening the period required for the regeneration and in economizing the regenerating agent.

Thus, since the separation of the resins is effected by means of a sugar solution having a high specific gravity without the sweetening-off after a purification operation is completed, the period required for the separation is reduced, the separation becomes complete, and the regenerating efficiency becomes higher, resulting in larger purifying capacity. Because as separating liquors which have a high specific gravity the beet sugar juice to be purified or treated or a sugar juice similar thereto in quality and with its concentration adjusted is used, it becomes unnecessary to provide a special solution for the separation. In addition, by virtue of the above procedure, there is no fear of mixing a heterogeneous solution for the separation into the purified sugar juice. Furthermore, the solution for the separation is not lost at all but recovered completely. Thus the resins used in a mixed bed type ion exchange apparatus in which the separation of rseins is difficult may be regenerated extremely effectively.

Based on the above various studies, the new process for the purification of beet sugar juice of this invention has been originated, in which a beet sugar juice is treated in the first stage of operation using a mixed bed type column containing a weakly acidic cation exchange resin and weakly basic or medium basic anion exchange resin. A caustic alkali solution as the regenerating agent which is passed through a strongly basic anion exchange resin of the second stage at first is passed through the weakly basic or medium basic anion exchange resin of the first stage so as to regenerate the resin, and the beet sugar juice pertaining to the purification or a sugar solution of similar quality thereto adjusted in concentration, is passed through the resins in the mixed bed type column up flow so as to separate the resins from each other effectively.

By virtue of the process of this invention, a product far superior to the prior art in color, order, and clarity of solution and much higher in yield may be produced. Thus an extremely large profit may be made. Furthermore, in the sugar manufacturing operation, there is no lowering in thermal efficiency as it is always possible to maintain a constant capacity in the multiple effect evaporator because there is no fear of scale occurring inside the evaporator, and a large quantity of steam may be economized by virtue of lowering of the pan-boiling temperature, reduction of remelt boiling, and increase of percent crystallization. The crystallizer may be reduced down to one third of a conventional one.

The invention will be better understood and other objects and additional advantages of the invention will become apparent upon perusal of the following description made in connection with the drawings. The scope of the invention will be defined in the appended claims.

In the drawings,

Fig. 1 shows a flow sheet of the process for the purification of beet sugar juice by means of ion exchange resins embodying this invention; and Fig. 2 shows an arrangement of resin columns in the process shown in Fig. 1.

The following examples are presented in order that the preparation and properties of the products of this invention may be thoroughly understood and recognized. The examples are not to be taken, however, as limiting this invention.

*Example 1*

A sugar content of beet was extracted from beet, saturated with carbon dioxide, and filtered, obtaining a sugar juice which was inspected as follows:

Concentration of sugar_____ 12.0° Brix.
Content of salts_____ 2000 mg. as $CaCO_3$/litre of sugar juice.
Color value (Stammer degree)_____ 10.0.
Apparent purity of sugar___ 92.0.
Temperature of sugar juice__ 60° C.

The beet sugar juice was passed through a resin column of the first stage which is explained as follows: A heat retaining jacketed column of an organic glass of 4 cm. in diameter and 2 m. in height was provided as the resin column for the first stage of the operation. 500 cc. of a weakly acidic cation exchange resin, Amberlite IRC–50 and 1,000 cc. of a weakly basic anion exchange resin, Amberlite IR–45 were packed inside the column, which had been prepared as follows: The resins were separated into two beds by means of passing upwards a beet sugar juice of 30° Bx. Then water was passed downwards through the resins so as to recover the sugar juice. Then Amberlite IR–45 was treated with about 3 litres of waste alkaline solution derived from the strongly basic anion exchange resin of the second stage of the operation described hereinafter, and washed with water. Amberlite IRC–50 was treated with 1.5 litre of 5% HCl and washed with water. Air was passed through these resins which were then mixed thoroughly. Then the column was charged with the prepared resins.

The sugar juice passed through the first stage of operation was passed through the resin column of the second stage of the operation which is explained as follows: A column of an organic glass of 4 cm. in diameter and 2 m. in height was provided as the resin column for the second stage of the operation. 500 cc. of a weakly acidic cation exchange resin, Amberlite IRC–50, and 1,000 cc. of a strongly basic anion exchange resin, Amberlite IRA–401, were packed inside the column, which has been prepared as follows: The resins were separated into two beds by means of passing upwards a beet sugar juice of 20° Bx. Then water was passed downwards through the resins so as to recover the sugar juice. Then Amberlite IRC–50 was treated with 1.5 litre of 5% HCl and washed with water. Amberlite IRA–401 was treated with 3 litres of 4% NaOH and washed with water. Air was passed through these resins which were then mixed thoroughly. Then the column was charged with the prepared resins.

Results of the operation per stage were as follows:

Quantity of sugar juice treated ___ 20 litres.
Juice treated at the first stage—
    Concentration of sugar _____ 11.5° Brix.
    Contents of salts _____ 1,200 mg. as $CaCO_3$/litre.
    Color value (Stammer) _____ 5.0.
    Apparent purity of sugar ___ 94.5.
    Temperature of sugar juice __ 59° C.
Juice treated at the second stage—
    Concentration of sugar _____ 11.1° Brix.
    Contents of salts _____ Less than 10 mg. as $CaCO_3$/litre.
    Color value (Stammer) _____ Less than 1.0.
    Apparent purity of sugar _____ More than 99.9.
    Temperature of sugar juice __ 58° C.

For reference, a comparison of the raw sugar juice with the purified sugar juice of this embodiment is given as follows:

|  | Raw sugar juice | Purified sugar juice |
| --- | --- | --- |
| N-compounds | 0.05–0.08% | 0.00. |
| Color (Stammer's degree) | 10.0 | less than 1.0. |
| Odor | beet odor | none. |
| Apparent purity | 92.0 | more than 99.9. |
| True purity | 91.5 | 99.6. |

Several times of pan-boiling of the purified and concentrated juice gave sucrose crystals with the following yield.

Percent
When the purification was effected in accordance with this invention _____ 98.5
When employing the conventional process _____ 81.2

The product according to this invention was extraordinarily superior to the product of the conventional process of the prior art, having better color, no odor, and no trend to become cloudy when dissolved. The product was as high in grade as refined cane sugar.

*Example 2*

Raw juice, a beet sugar juice:
 Concentration of sugar ___ 12.4° Brix.
 Contents of salts _____ 2,000 mg. as CaCO₃/litre.

Two sets comprising a column A and a column B, respectively, were used as mixed bed type ion exchange apparatus as follows:

For the first stage—
 Resin column: Diameter 4 cm., height 2 m.
 Resins packed:
  Cation exchange resin, Amberlite IRC-50 500 cc.
  Anion exchange resin, Amberlite IR-45 1,000 cc.
For the second stage—
 Resin column: Diameter 4 cm., height 2 m.
 Resins packed:
  Cation exchange resin, Amberlite IRC-50 500 cc.
  Anion exchange resin, Amberlite IRA-401 1,000 cc.
 (Both resins had been used for 100 cycles)

After a batch of the above-stated beet sugar juice had been purified by means of passing downwards through the mixed bed type apparatus, the resins of column A were regenerated in accordance with the process of this invention, while the resins of column B were regenerated by a conventional process.

Speaking in detail, a beet sugar juice, of which the sugar concentration was 30° Bx. and which was part of the result of a concentration operation given to the treated juice obtained from the bottom of column A of the first stage, was passed upwards through column A, and air was passed through the same column from time to time in the early stage of the operation, so as to separate the resins into two beds.

After the resins had been separated, the juice was removed down to the level of the top of the resin bed, and then water was poured into the column so as to displace the juice which was recovered. Then Amberlite IRC-50, bedded lower, was treated with 1.5 litre of 5% HCl, while Amberlite IR-45, bedded higher, was treated with about 3 litres of waste alkaline solution described hereinafter. Air was blown in through the resins after washing and then the resins were mixed.

As to column B, just after the purification of sugar, water was poured into the column so as to make sweetening off. Then the resins were separated by means of passing water upwards. The lower bed of Amberlite IRC-50 was treated with 1.5 litre of 5% HCl, while the higher bed of Amberlite IR-45 was treated with about 3 litres of waste alkaline solution described hereinafter. After the resins were washed, they were mixed in the same way as the afore-stated resins.

As to the second stage, just after the purification of sugar had been completed, a beet sugar juice of 20° Bx. was admitted into column A through the bottom thereof so as to separate the resins into two beds. Then the sugar juice was removed down to the level of the top of the resin and then water was poured into the column from the top of the column so as to recover the sugar juice. Then Amberlite IRC-50 bedded lower was treated with 1.5 litre of 5% hydrochloric acid, while Amberlite IRA-401 bedded higher was treated with 3 litres of 4% caustic soda. After washing with water, air was blown into the resins which were then mixed.

As to column B of the second stage, just after the purification had been completed, a sweetening off operation was effected. Water was admitted into column B through the bottom thereof so as to separate the resins into two beds. Amberlite IRC-50 of the lower bed was treated with 1.5 litre of 5% hydrochloric acid, while Amberlite IRA-401 of the higher bed was treated with 3 litres of 4% caustic soda. After washing, the resins were mixed similarly.

Then the above-stated raw beet sugar juice was passed downwards through column A and column B, respectively, of the first stage, and then the respective resultant juice was passed through the second stage and the following results were obtained:

TABLE 1.—RESULTS OF THE FIRST STAGE OF OPERATION

| | Column A (according to the process of this invention) | Column B (according to the regenerating process of the prior art) |
|---|---|---|
| Quantity treated | 20 litres | 20 litres. |
| Sugar concentration of juice treated | 12.1° Bx | 12.1° Bx. |
| Salts contents of juice treated | 1,200 mg./litre as CaCO₃ | 1,400 mg./litre as CaCO₃. |
| Desalting rate | 40% | 30%. |

TABLE 2.—RESULTS OF THE SECOND STAGE OF OPERATION

| | Column A (according to the process of this invention) | Column B (according to the regenerating process of the prior art) |
|---|---|---|
| Yield of the purified juice | 20 litres | 15 litres. |
| Sugar concentration of juice treated | 11.7 | 11.5. |
| Salts content of juice treated | less than 10 mg./litre as CaCO₃ | less than 10 mg./litre as CaCO₃. |

While particular embodiments of the invention have been illustrated and described, modifications thereof will readily occur to those skilled in the art. It should be understood therefore that the invention is not limited to the particular embodiments disclosed but that the appended claims are intended to cover all modifications which do not depart from the true spirit and scope of the invention.

What is claimed as new and desired to be secured by Letters Patent of the United States is:

1. A process for the purification of beet sugar juice comprising a first stage of the purification operation and a second stage of the purification operation, a beet sugar juice extracted out of beet and then pretreated being passed through a resin column of said first stage in which a mixture of a hydrogen type weakly acidic cation exchange resin and an anion exchange resin selected from the group consisting of hydroxyl type weakly basic anion exchange resins and hydroxyl type medium basic anion exchange resins, is packed and an outflow juice from said resin column of the first stage being passed through another resin column of said second stage in which a mixture of a hydrogen type weakly acidic cation exchange resin and a strongly basic anion exchange resin is packed, whereby said beet sugar juice is desalted and decolorized and a used solution obtained in regenerating said strongly basic anion exchange resin of the second stage being passed through said weakly basic and medium basic anion exchange resin whereby the latter is regenerated.

2. A process for the separation of the ion exchange resins referred to in the claim 1, for the regeneration thereof, comprising passing upflow a beet sugar juice of the type pertaining to the purification, the concentration of which has been adjusted, through said resins.

3. A process for the regeneration of the ion exchange resins referred to in claim 1, comprising passing a regenerating agent through said resin column of the first stage, said regenerating agent being a used solution passed through said resin column of the second stage for the regeneration thereof, and fresh caustic alkali solution added to said used solution.

4. A process for the regeneration of the ion exchange resins referred to in claim 1 comprising the step of passing fresh caustic alkali solution through said strongly basic anion exchange resin used in said second stage, storing the outflow of said step, utilizing the stored solution for regeneration of said strongly basic anion exchange resin of said second stage of the operation in the early period of regeneration of the following cycle of operation, and using the outflow of the above step for the regeneration of said weakly basic and medium basic anion exchange resin of said first stage of operation.

References Cited in the file of this patent

UNITED STATES PATENTS

| | | |
|---|---|---|
| 2,403,177 | Gustafson | July 2, 1946 |
| 2,413,844 | Rawlings | Jan. 7, 1947 |
| 2,522,022 | Durant | Sept. 12, 1950 |
| 2,551,519 | Winters | May 1, 1951 |
| 2,564,820 | Smit | Aug. 21, 1951 |
| 2,568,925 | Mills | Sept. 25, 1951 |
| 2,578,937 | Kunin | Dec. 18, 1951 |
| 2,578,938 | Kunin | Dec. 18, 1951 |

OTHER REFERENCES

Sugar, Art. by Fort et al., April 1955, pp. 43–45.